(12) United States Patent
Bates et al.

(10) Patent No.: US 7,787,164 B2
(45) Date of Patent: Aug. 31, 2010

(54) APPARATUS AND METHOD TO EVALUATE A HOLOGRAPHIC DATA STORAGE MEDIUM

(75) Inventors: Allen Keith Bates, Tucson, AZ (US); Nils Haustein, Soergenloch (DE); Craig Anthony Klein, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 597 days.

(21) Appl. No.: 11/679,089

(22) Filed: Feb. 26, 2007

(65) Prior Publication Data
US 2008/0208905 A1 Aug. 28, 2008

(51) Int. Cl.
*G03H 1/26* (2006.01)
(52) U.S. Cl. .................... 359/22; 359/15; 359/900; 382/209; 702/82
(58) Field of Classification Search .............. 359/1
See application file for complete search history.

(56) References Cited

U.S. PATENT DOCUMENTS

| | | | |
|---|---|---|---|
| 5,963,346 A | 10/1999 | Stappaerts | |
| 6,046,830 A | 4/2000 | Linke et al. | |
| 6,226,415 B1 | 5/2001 | Wilson et al. | |
| 6,630,824 B2 | 10/2003 | Richter | |
| 6,788,443 B2 * | 9/2004 | Curtis et al. | 359/22 |
| 6,987,630 B1 | 1/2006 | Higgins et al. | |
| 2003/0067697 A1 * | 4/2003 | Weinstein et al. | 360/31 |
| 2004/0230746 A1 | 11/2004 | Olds et al. | |
| 2008/0062796 A1 * | 3/2008 | Bates et al. | 365/216 |
| 2009/0086299 A1 * | 4/2009 | Bates et al. | 359/35 |

OTHER PUBLICATIONS

Best et al., "The future of magnetic data storage technology", IBM J. Res. Develop., pp. 311-322, vol. 44, No. 3, May 2000.
Burr et al., "Experimental evaluation of user capacity in holographic data-storage systems", Optical Society of America, pp. 5431-5443, vol. 37, No. 23, Aug. 10, 1998.
Sanchez et al., "Detection and reallocation of defective clusters in removable DASD media", IBM TDB, pp. 571-572, vol, 37, Pub. No. 6B, Jun. 1994.

* cited by examiner

*Primary Examiner*—Arnel C Lavarias
(74) *Attorney, Agent, or Firm*—Dale F. Regelman; Quarles & Brady LLP

(57) ABSTRACT

A method to evaluate a holographic data storage medium, wherein the holographic data storage medium is evaluated by a manufacturer. In certain embodiments, the holographic data storage medium is evaluated by a customer prior to encoding customer information into the storage medium. In certain embodiments, the holographic data storage medium is evaluated by a customer after encoding customer information therein.

14 Claims, 14 Drawing Sheets

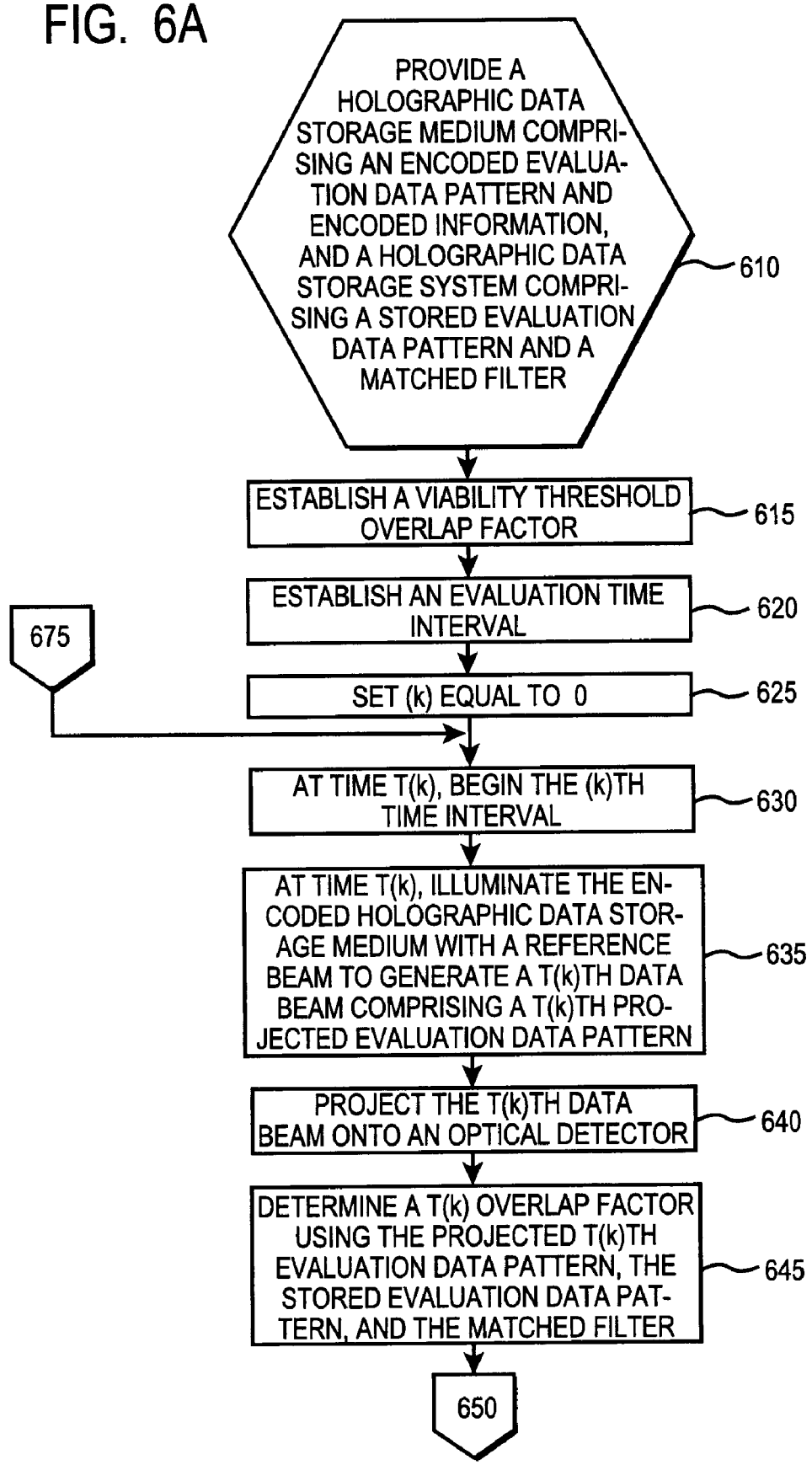

FIG. 9

|  | HOLOGRAPHIC DATA STORAGE MEDIUM 0 | HOLOGRAPHIC DATA STORAGE MEDIUM 1 | HOLOGRAPHIC DATA STORAGE MEDIUM 2 | HOLOGRAPHIC DATA STORAGE MEDIUM 3 | HOLOGRAPHIC DATA STORAGE MEDIUM 4 |
|---|---|---|---|---|---|
| HOLOGRAPHIC DATA STORAGE SYSTEM 0 | MAX_DIFFERENCE 0.2 | MAX_DIFFERENCE 0.25 | MAX_DIFFERENCE 0.1 | MAX_DIFFERENCE 0.25 | MAX_DIFFERENCE 0.3 |
| HOLOGRAPHIC DATA STORAGE SYSTEM 1 | MAX_DIFFERENCE 0 | MAX_DIFFERENCE 0.25 | MAX_DIFFERENCE 0.2 | MAX_DIFFERENCE 0.2 | MAX_DIFFERENCE 0.25 |
| HOLOGRAPHIC DATA STORAGE SYSTEM 2 | MAX_DIFFERENCE 0.2 | MAX_DIFFERENCE 0.2 | MAX_DIFFERENCE 0.2 | MAX_DIFFERENCE 0.2 | MAX_DIFFERENCE 0.1 |
| HOLOGRAPHIC DATA STORAGE SYSTEM 3 | MAX_DIFFERENCE 0.25 | MAX_DIFFERENCE 0.2 | MAX_DIFFERENCE 0.25 | MAX_DIFFERENCE 0 | MAX_DIFFERENCE 0.2 |
| HOLOGRAPHIC DATA STORAGE SYSTEM 4 | MAX_DIFFERENCE 0.25 | MAX_DIFFERENCE 0 | MAX_DIFFERENCE 0.3 | MAX_DIFFERENCE 0.3 | MAX_DIFFERENCE 0.2 |

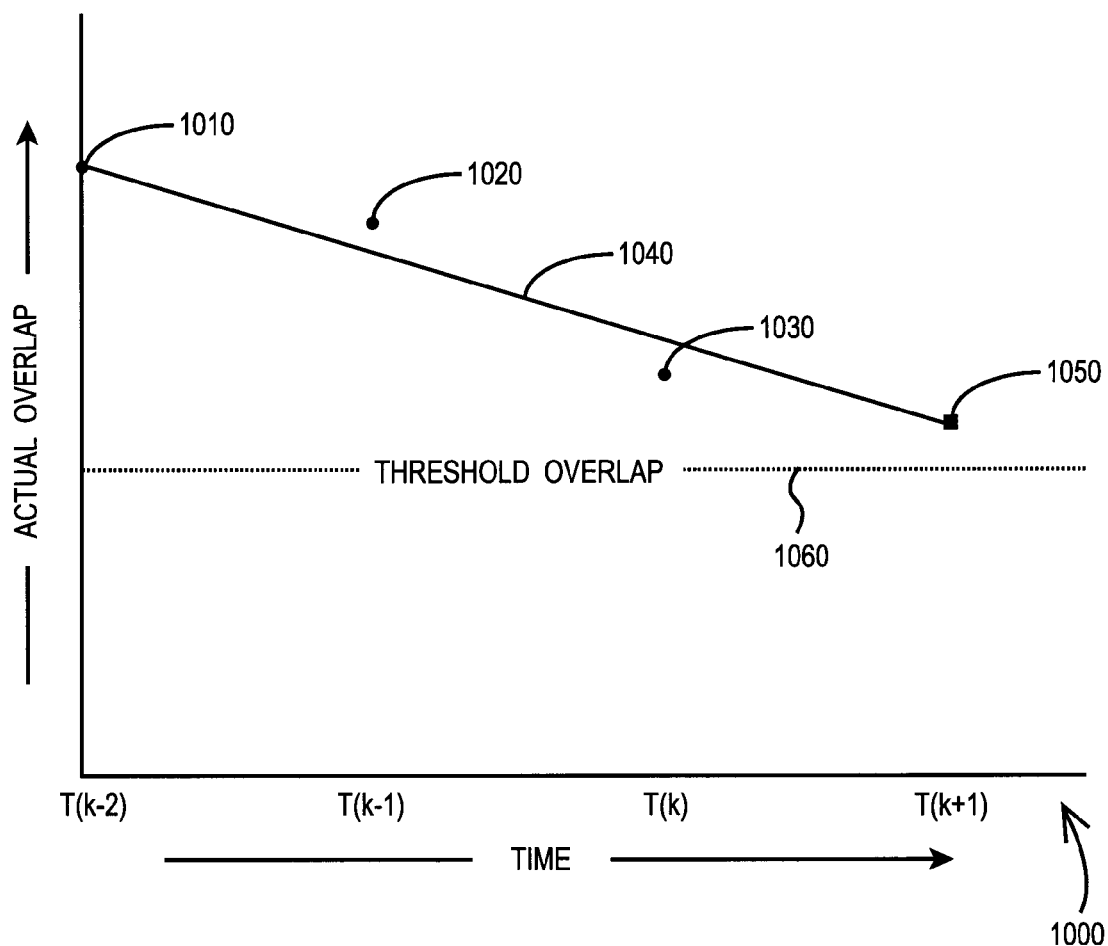

APPARATUS AND METHOD TO EVALUATE A HOLOGRAPHIC DATA STORAGE MEDIUM

FIELD OF THE INVENTION

This invention relates to an apparatus, and method using that apparatus, to evaluate a holographic data storage medium. In certain embodiments, the holographic data storage medium is evaluated by the manufacturer. In certain embodiments, the holographic data storage medium is evaluated by a customer prior to encoding customer information into the storage medium. In certain embodiments, the holographic data storage medium is evaluated by a customer after encoding customer information therein.

BACKGROUND OF THE INVENTION

In holographic information storage, an entire page of information is stored at once as an optical interference pattern within a thick, photosensitive optical material. This is done by intersecting two coherent laser beams within the storage material. The first, called the data beam, contains the information to be stored; the second, called the reference beam, is designed to be simple to reproduce—for example, a simple collimated beam with a planar wavefront.

The resulting optical interference pattern, of the two coherent laser beams, causes chemical and/or physical changes in the photosensitive medium: a replica of the interference pattern is stored as a change in the absorption, refractive index, or thickness of the photosensitive medium. When the stored interference pattern is illuminated with one of the two waves that was used during recording, some of this incident light is diffracted by the stored interference pattern in such a fashion that the other wave is reconstructed. Illuminating the stored interference pattern with the reference wave reconstructs the data beam, and vice versa.

A large number of these interference patterns can be superimposed in the same thick piece of media and can be accessed independently, as long as they are distinguishable by the direction or the spacing of the patterns. Such separation can be accomplished by changing the angle between the object and reference wave or by changing the laser wavelength. Any particular data page can then be read out independently by illuminating the stored patterns with the reference wave that was used to store that page. Because of the thickness of the hologram, this reference wave is diffracted by the interference patterns in such a fashion that only the desired object beam is significantly reconstructed and imaged on an electronic camera. The theoretical limits for the storage density of this technique are on the order of tens of terabits per cubic centimeter.

SUMMARY OF THE INVENTION

Applicants' invention comprises a method to evaluate a holographic data storage medium. In certain embodiments, the method supplies a holographic data storage system comprising a stored evaluation data pattern, a matched filter, a light source, an optical detector, and a holographic data storage medium comprising an encoded evaluation data pattern, wherein that holographic data storage medium has not been sold in commerce.

The method establishes a threshold manufacturer overlap value, illuminates the holographic data storage medium with a reference beam to generate a pre-sale data beam comprising a projected evaluation data pattern, and projects that pre-sale data beam onto the optical detector.

The method then calculates a pre-sale overlap value using the projected evaluation data pattern, the stored evaluation data pattern, and the matched filter, and determines if the pre-sale overlap value is greater than or equal to the threshold manufacturer overlap value. If the method determines that the pre-sale overlap value is greater than or equal to the threshold manufacturer overlap value, then the manufacturer offers said holographic data storage medium for sale in commerce. On the other hand, if the pre-sale overlap value is not greater than or equal to the threshold manufacturer overlap value, then the manufacturer does not offer the holographic data storage medium for sale in commerce.

BRIEF DESCRIPTION OF THE DRAWINGS

The invention will be better understood from a reading of the following detailed description taken in conjunction with the drawings in which like reference designators are used to designate like elements, and in which:

FIG. 6A a flow chart summarizing the initial steps in a fourth embodiment of Applicants' method;

FIG. 9 is a block diagram showing one embodiment of a database used in the method of FIG. 5;

FIG. 10A is a graph showing three calculated overlap values and a predicted fourth overlap value;

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
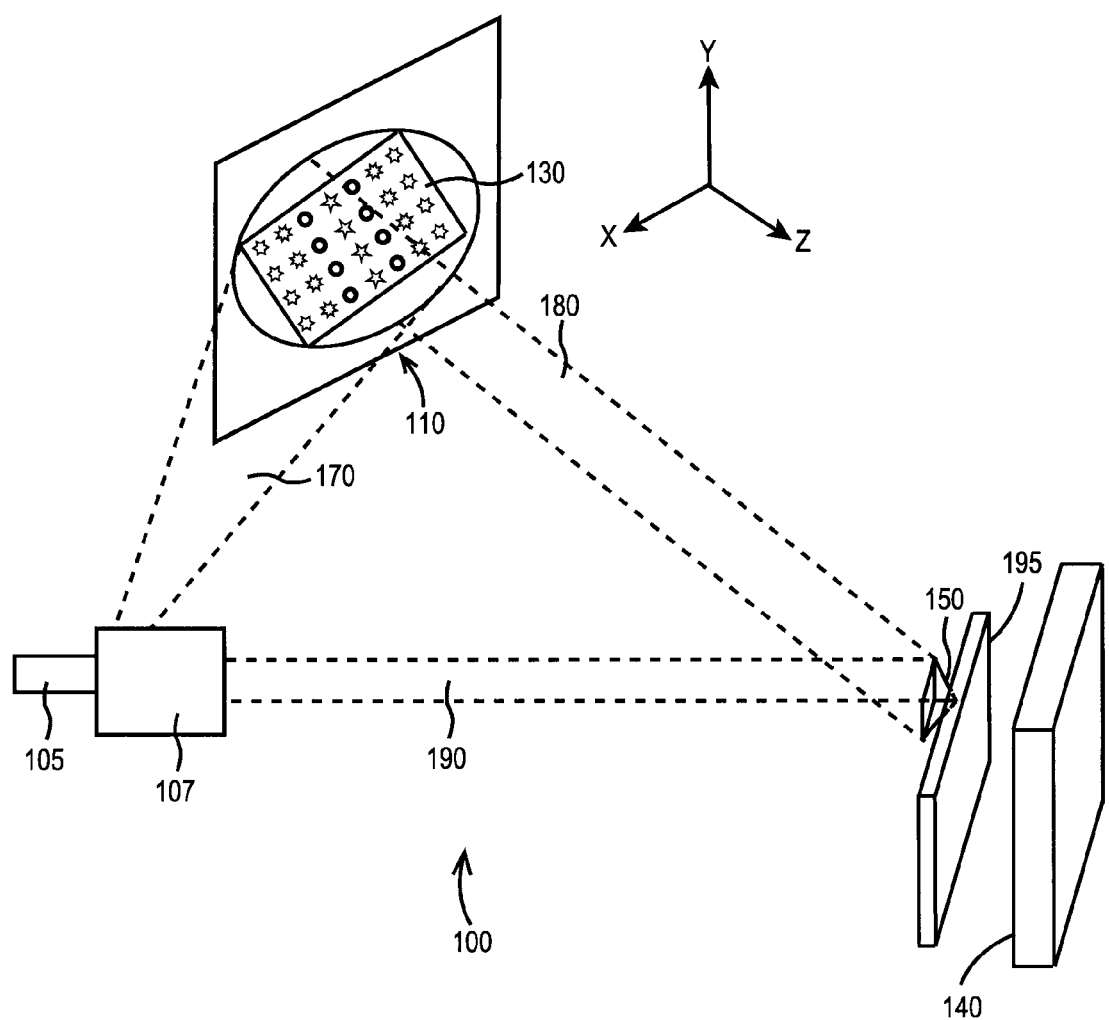
FIG. 1A is a perspective view of one embodiment Applicants' holographic data storage system shown being used to encode information into a holographic data storage medium.
Figure 1B:
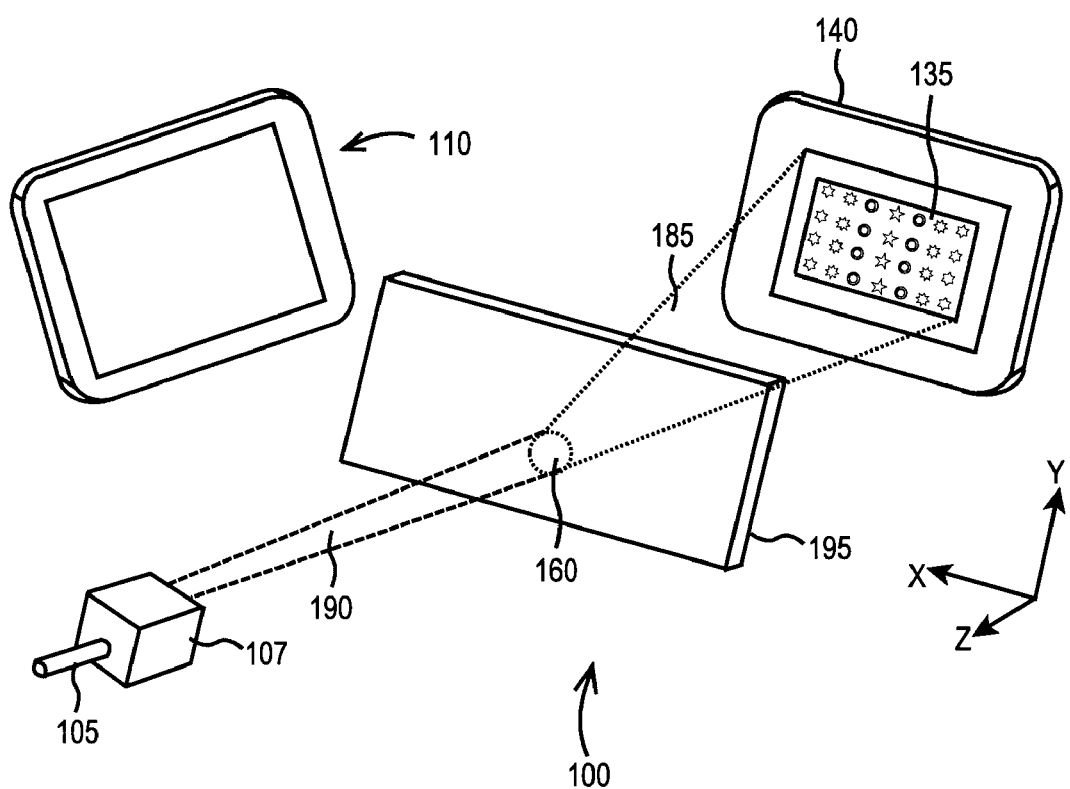
FIG. 1B is the holographic data storage system of FIG. 1A shown being used to decode information encoded in a holographic data storage medium.

Referring now to FIGS. 1A and 1B, holographic data storage system 100 comprises laser light source 105, beam splitter 107, reflective spatial light modulator 110, optical detector 140, and holographic storage medium 195. The light generated by source 105 is split by beam splitter 107 into reference beam 190, and carrier beam 170.

Figure 7:
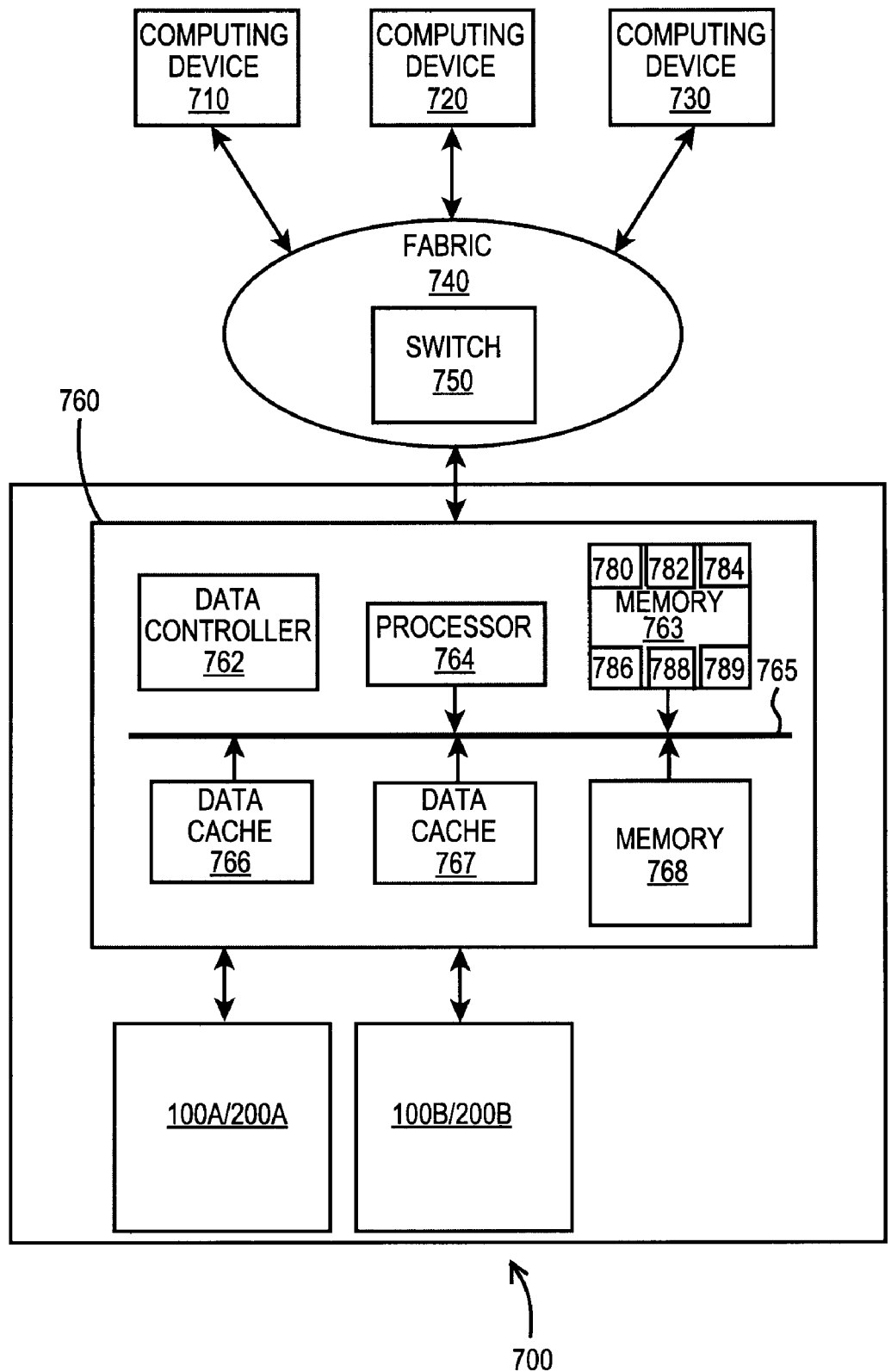
FIG. 7 is a block diagram showing a holographic storage controller.

In the illustrated embodiment of FIG. 1A, an image 130 is shown displayed on reflective spatial light modulator ("RSLM") 110, wherein image 130 comprises evaluation data pattern 782 (FIG. 7). In certain embodiments, RSLM 110 comprises an assembly comprising a plurality of micro mirrors. In other embodiments, RSLM 110 comprises a liquid crystal on silicon ("LCOS") display device. In contrast to nematic twisted liquid crystals used in Liquid Crystal Displays ("LCDs"), in which the crystals and electrodes are sandwiched between polarized glass plates, LCOS devices have the liquid crystals coated over the surface of a silicon chip. The electronic circuits that drive the formation of the image are etched into the chip, which is coated with a reflective (aluminized) surface. The polarizers are located in the light path both before and after the light bounces off the chip. LCOS devices are easier to manufacture than conventional LCD displays. LCOS devices have higher resolution because several million pixels can be etched onto one chip. LCOS devices can be much smaller than conventional LCD displays.

Carrier beam 170 picks up image 130 as the light is reflected off RSLM 110 to form reflected data beam 180 comprising image 130. Unreflected reference beam 190 interferes with data beam 180 to form hologram 150, wherein hologram 150 comprises Applicants' evaluation data pattern image 130. Hologram 150 is formed within storage medium 195 thereby causing the photo-active storage medium to create interference pattern 160 (FIG. 1B) comprising an encoded hologram 150.

FIG. 1B shows reference beam 190 directed toward encoded holographic storage medium 195 such that reference beam 190 is diffracted by the interference pattern 160 which comprises hologram 150 (FIG. 1A) to form reconstructed data beam 185 which comprises evaluation data pattern image 135. Image 135 is projected onto optical detector 140. Optical detector 140 then captures the information comprising image 135.

Figure 2A:
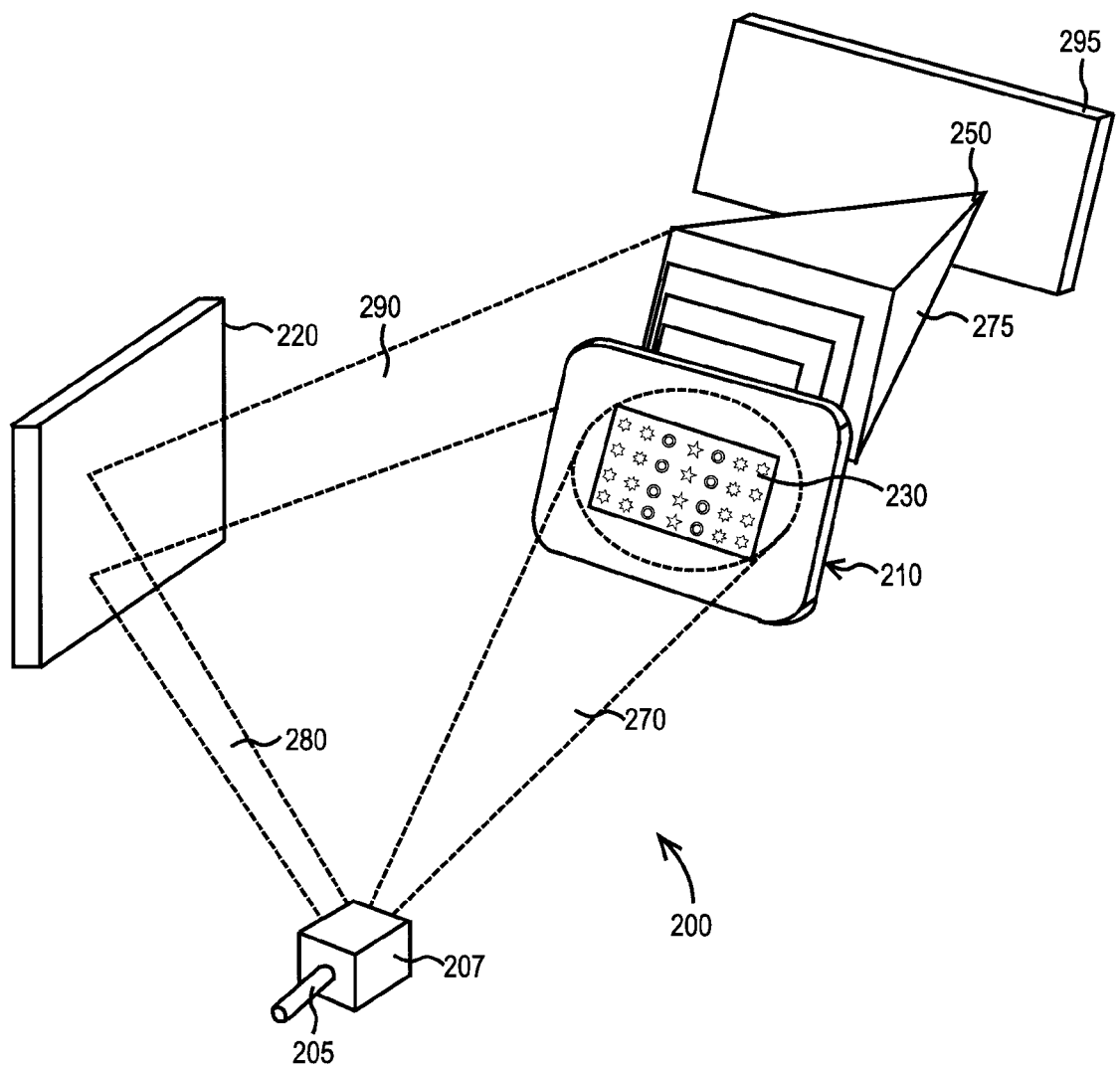
FIG. 2A is a perspective view of a second embodiment Applicants' holographic data storage system shown being used to encode information into a holographic data storage medium.

FIG. 2A illustrates a holographic data storage system 200. System 200 comprises a laser light source 205, a laser splitter 207, carrier beam 270, and reference beam 280. In the illustrated embodiment of FIG. 2A, system 200 further comprises a transmissive spatial light modulator ("TSLM") 210, a data beam 275, a mirror 220, and a holographic data storage medium 295.

In certain embodiments, TSLM 210 comprises an LCD-type device. The TSLM 210 is typically translucent, where information is represented by either a light or a dark pixel on the TSLM 210 display. Laser light originating from the laser source 205 is split by the beam splitter 207 into two beams, a carrier beam 270 and a reference beam 280.

The carrier beam 270 picks up the image 230 displayed by the TSLM 210 as the light passes through the TSLM 210, wherein image 230 comprises Applicants' evaluation data pattern 782. Reference beam 280 is reflected by the mirror 220 to produce reflected reference beam 290. Reflected reference beam 290 interferes with the data beam 275 to form hologram 250. Hologram 250 is encoded into holographic data storage medium 295, as interference pattern 260 (FIG. 2B).

Figure 2B:
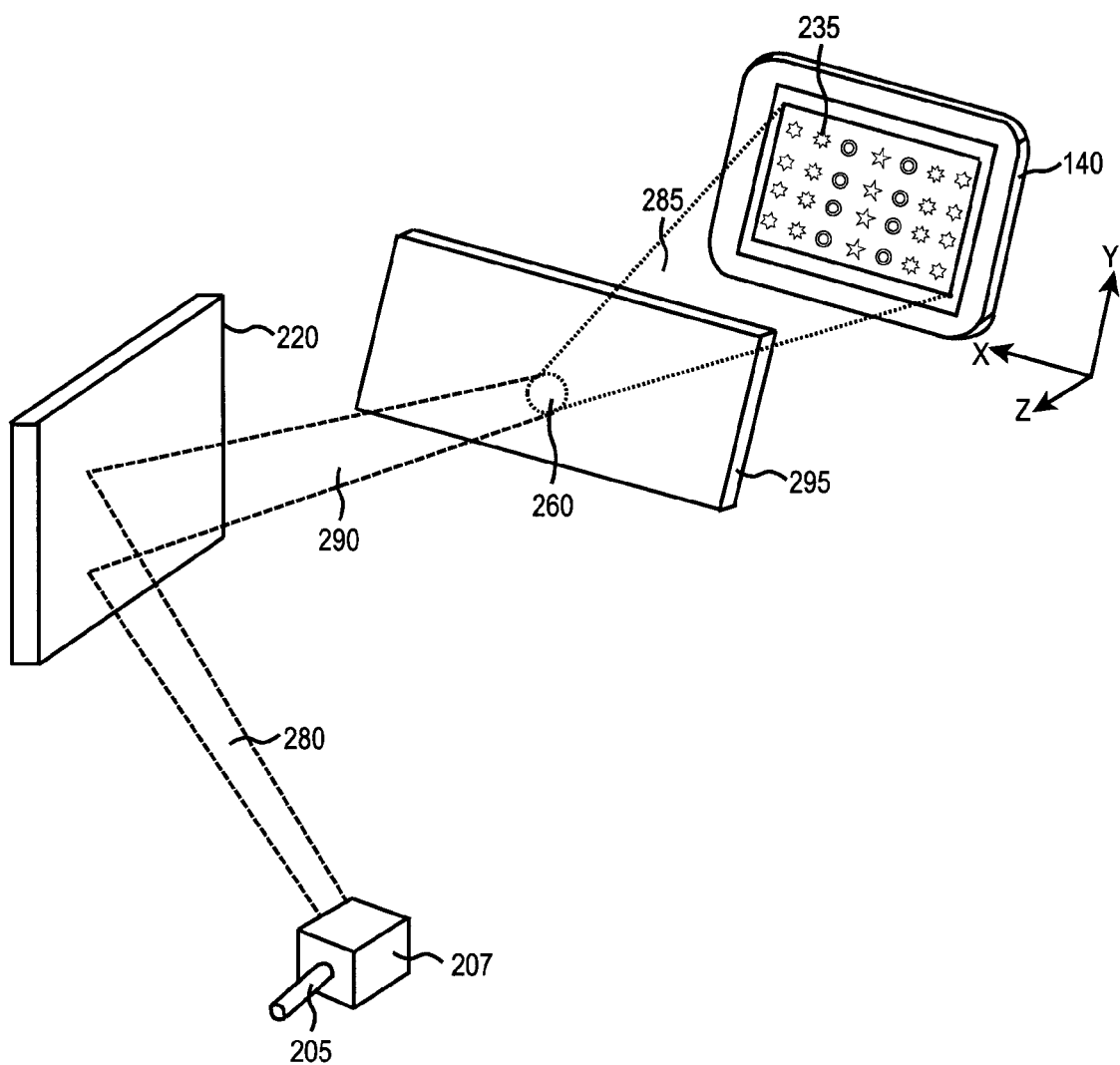
FIG. 2B is the holographic data storage system of FIG. 2A shown being used to decode information encoded in a holographic data storage medium.

FIG. 2B shows laser light 205 split by beam splitter 207 to create reference beam 280. Reference beam 280 is reflected off of mirror 220 to become reflected reference beam 290 which is directed toward encoded holographic storage medium 295 such that reflected reference beam 290 is diffracted by the interference pattern 260 to form reconstructed data beam 285 which comprises evaluation data pattern image 235. Image 235 is projected onto the optical detector 140. The optical detector 140 then captures the information comprising image 235.

FIG. 7 illustrates one embodiment of Applicants' holographic data storage and retrieval system 700. In the illustrated embodiment of FIG. 7, holographic data storage and retrieval system 700 communicates with computing devices 710, 720, and 730. In the illustrated embodiment of FIG. 7, computing devices 710, 720, and 730 communicate with storage controller 760 through a data communication fabric 740. In certain embodiments, fabric 740 comprises one or more data switches 750. Further in the illustrated embodiment of FIG. 7, storage controller 760 communicates with one or more holographic encoding/decoding systems. In the illustrated embodiment of FIG. 7, holographic data storage and retrieval system 700 comprises holographic data storage system 100 (FIGS. 1A, 1B,) and/or holographic data storage system 200 (FIGS. 2A, 2B).

In certain embodiments, computing devices 710, 720, and 730, are selected from the group consisting of an application server, a web server, a work station, a host computer, or other like device from which information is likely to originate. In certain embodiments, one or more of computing devices 710, 720, and/or 730 are interconnected with fabric 740 using Small Computer Systems Interface ("SCSI") protocol running over a Fibre Channel ("FC") physical layer. In other embodiments, the connections between computing devices 710, 720, and 730, comprise other protocols, such as INFINIBAND, Ethernet, or Internet SCSI ("iSCSI") (INFINIBAND is a registered trademark of System I/O Inc.). In certain embodiments, switches 750 are configured to route traffic from the computing devices 710, 720, and/or 730, directly to the storage controller 760.

In the illustrated embodiment of FIG. 7, storage controller 760 comprises a data controller 762, memory 763, memory 768, processor 764, and data caches 766 and 767, wherein these components communicate through a data bus 765. In certain embodiments, memory 763 comprises a magnetic information storage medium, an optical information storage medium, an electronic information storage medium, and the like. By "magnetic storage medium," Applicants mean, for example, a device such as a hard disk drive, floppy disk drive, or magnetic tape. By "optical information storage medium," Applicants mean, for example, a Digital Versatile Disk ("DVD"), High-Definition DVD ("HD-DVD"), BLU-RAY DISC ("BD"), Magneto-Optical ("MO") disk, Phase-Change "(PC") disk, etc. (BLU-RAY DISC is a registered trademark of Sony). By "electronic storage media," Applicants mean, for example, a device such as a PROM, EPROM, EEPROM, Flash PROM, COMPACTFLASH, SMARTMEDIA, and the like. (COMPACTFLASH is a registered trademark of Sandisk Corporation; and SMARTMEDIA is a registered trademark of Toshiba Corporation). In certain embodiments, memory 768 comprises a magnetic information storage medium, an optical information storage medium, an electronic information storage medium, and the like. By "electronic storage media," Applicants mean, for example, a device such as a PROM, EPROM, EEPROM, Flash PROM, COMPACTFLASH, SMARTMEDIA, and the like. (COMPACTFLASH is a registered trademark of Sandisk Corporation; and SMARTMEDIA is a registered trademark of Toshiba Corporation).

Memory 763 contains as threshold manufacturer correlation factor 780, encoded evaluation data pattern 782, matched filter 784, viability threshold correlation factor 786, threshold customer correlation factor 788, and instructions 789.

In certain embodiments, the storage controller 760 is configured to read data signals from and write data signals to a serial data bus on one or more of the computing devices 710, 720, and/or 730. Alternatively, in other embodiments the storage controller 760 is configured to read data signals from and write data signals to one or more of the computing devices 710, 720, and/or 730, through the data bus 765 and the fabric 740.

In certain embodiments, storage controller 760 converts a serial data stream into a convolution encoded data images. Those data images are transferred to RSLM 110 (FIGS. 1A, 1B) and/or TSLM 210 (FIGS. 2A, 2B) disposed in one or more of holographic data storage systems 100 (FIGS. 1A, 1B) and/or 200 (FIGS. 2A, 2B).

In certain embodiments, holographic encoding/decoding systems 100A/200A and 100B/200B are located in different geographical places. In certain embodiments, storage controller 760 distributes information between two or more holographic encoding/decoding systems in order to protect the information.

Figure 3:
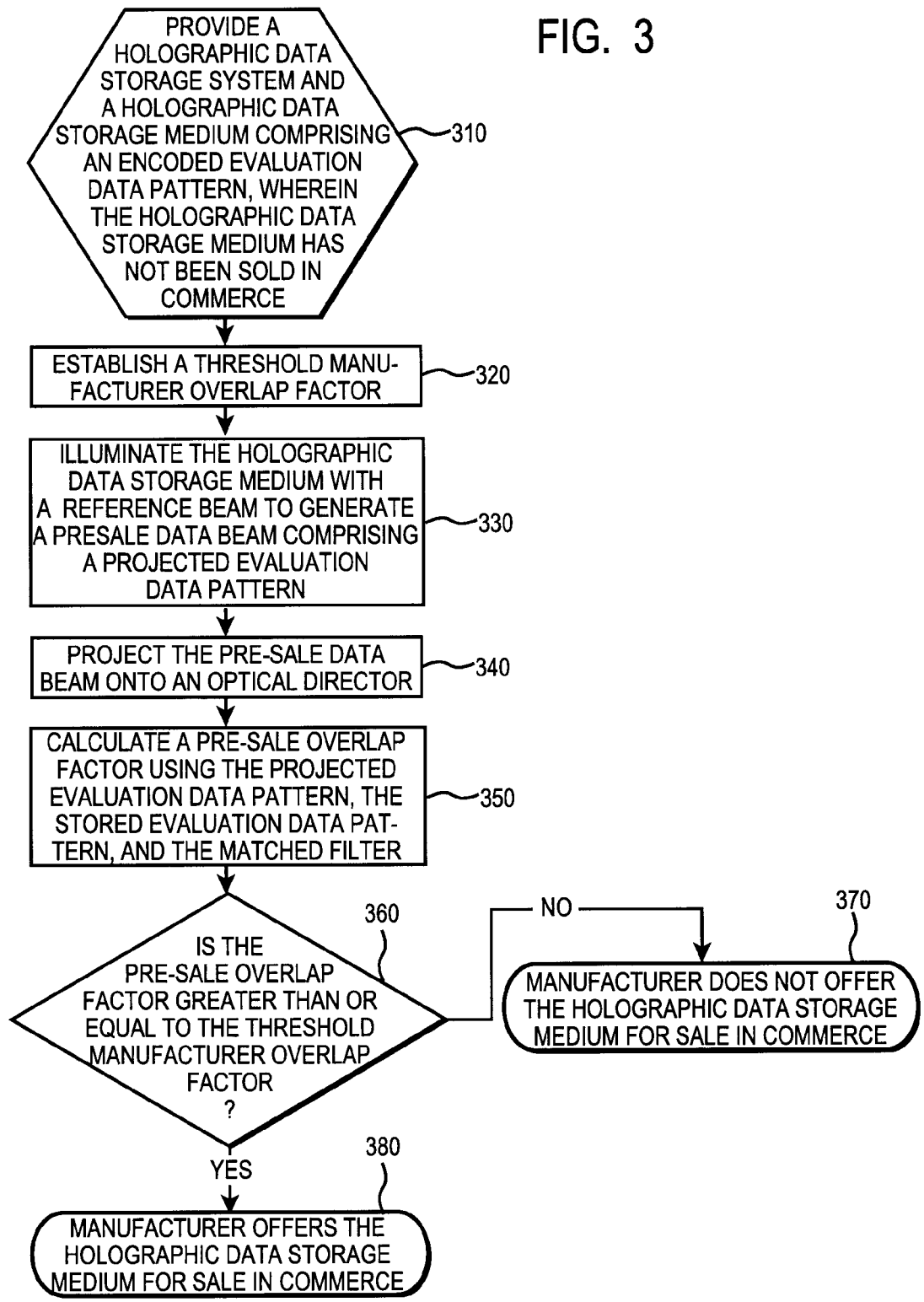
FIG. 3 is a flow chart summarizing one embodiment of Applicants' method.

Applicants' invention comprises a method to evaluate a holographic data storage medium, whereby the method provides a quality control/quality assurance procedure used by the manufacturer of the storage medium. Referring now to FIG. 3, in step 310 Applicants' method provides a holographic data storage system, such as for example Applicants' holographic data storage system 100 (FIGS. 1A, 1B) or 200 (FIGS. 2A, 2B), and a holographic data storage medium encoded with an evaluation data pattern, such as for example evaluation data pattern 782 (FIG. 7). In certain embodiments, the holographic data storage system is interconnected with a storage controller, such as for example and without limitation storage controller 760 (FIG. 7).

In certain embodiments, the encoded evaluation data pattern is integrally formed in the data storage medium, such as holographic data storage mediums 195 (FIGS. 1A, 1B) or 295 (FIGS. 2A, 2B), at the time of manufacture. In other embodiments, the evaluation data pattern is encoded in the holographic data storage medium using a precision holographic data recording apparatus, as shown for example in FIGS. 1A and/or 2A, operated by the manufacturer of the holographic data storage medium.

In step 320, Applicants' method establishes a manufacturer threshold overlap factor comprising the minimum required percentage overlap between a projected evaluation data pattern and a stored evaluation data pattern as seen through a matched filter. In certain embodiments, in step 320, Applicants' method establishes a threshold manufacturer correlation factor. In certain embodiments, the threshold manufacturer correlation factor of step 320 is written to memory 763 (FIG. 7) as threshold manufacturer correlation factor 780 (FIG. 7).

In step 330, Applicants' method illuminates the holographic data storage medium comprising encoded threshold evaluation data pattern, such as encoded evaluation data pattern 782, with a reference beam, such as reference beam 190 (FIGS. 1A, 1B) or reflected reference beam 290 (FIGS. 2A, 2B), to generate a pre-sale data beam, such as data beam 185 (FIG. 1B) or data beam 285 (FIG. 2B), wherein that pre-sale data beam comprises a projected evaluation data pattern, such as projected evaluation data pattern 135 (FIG. 1B) or 235 (FIG. 2B). In step 340, Applicants' method projects the pre-sale data beam of step 330 onto the optical detector of step 310, such as optical detector 140 (FIGS. 1A, 1B, 2A, 2B).

In step 350, Applicants' method calculates an actual overlap between the projected evaluation data pattern and the stored evaluation pattern as seen through the matched filter. In certain embodiments, in step 350 Applicants' method calculates a pre-sale correlation factor using the evaluation data pattern projected onto the optical detector in step 330, a stored evaluation data pattern, such as stored evaluation data pattern 782 (FIG. 7), and a matched filter, such as for example Applicants' matched filter 784 (FIG. 7).

Figure 8:
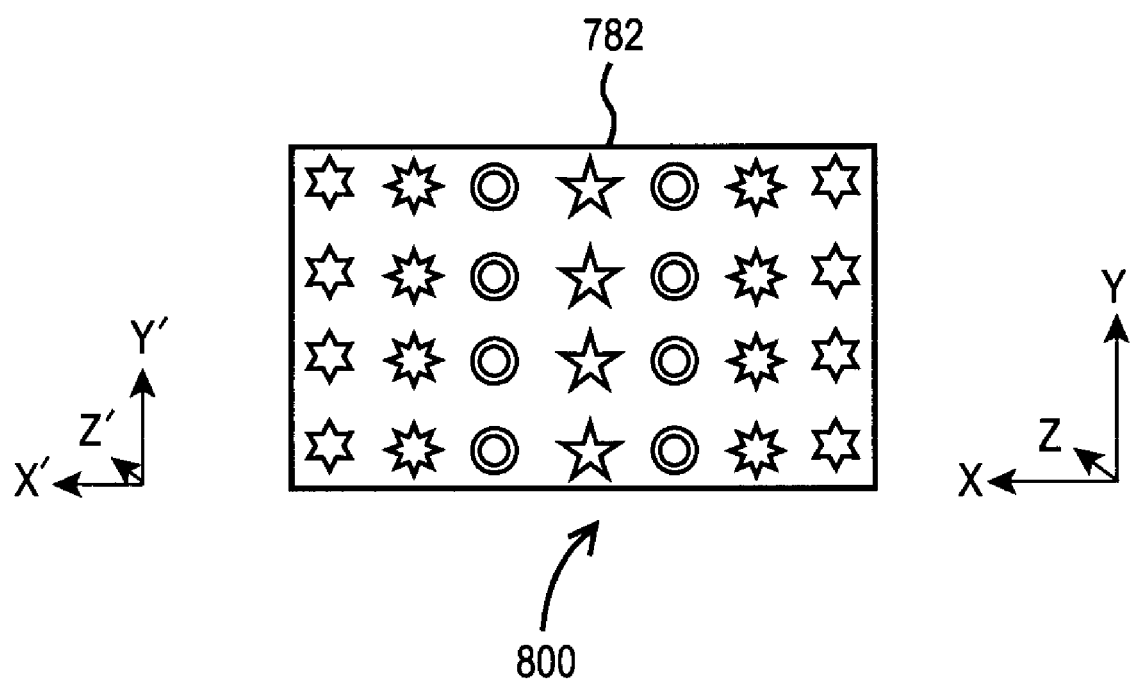
FIG. 8 shows Applicants' evaluation data pattern as seen through Applicants' matched filter.

Referring now to FIG. 8, image 800 comprises an evaluation data pattern 782 (FIG. 7) as seen through Applicants' matched filter 784 (FIG. 7), wherein the X' axis of image is 800 parallel to the X axis of optical detector 140 (FIGS. 1A, 1B, 2A, 2B), and wherein the Y' axis of image 800 is parallel to the Y axis of optical detector 140, and wherein the Z' axis of image 800 is parallel to the Z axis of optical detector 140. In certain embodiments, step 350 is performed by a processor, such as processor 764 (FIG. 7), disposed within a storage controller, such as and without limitation storage controller 760 (FIG. 7).

In certain embodiments, in step 350 Applicants' method calculates the difference between the projected read orientation image $g(x,y)$ and impulse response $h(x,y)=s^*(-x,-y)$ of the image 800 (FIG. 8). Referring now to Equation (1), $V(x,y)$ comprises the cross-correlation between the projected evaluation data pattern, such as for example projected evaluation data pattern 185 (FIG. 1B) or 285 (FIG. 2B) and $s(x,y)$ for image 800. As those skilled in the art will appreciate, Equation (1) comprises a double integral, meaning that the integration is over the X axis and Y axis directions of the input screen portion of the optical detector. Additionally, $\xi$ is the integration variable along that X axis, $\eta$ is the integration variable along that Y axis, and * denotes a complex conjugate.

$$V(x,y)=\iint g(\xi,\eta)s^*(\xi-x,\eta-y)d\xi d\eta \quad (1)$$

Mathematically, $V(x,y)$ comprises a surface varying along the X axis and the Y axis, for each $(x,y)$. There is one value of $V(x,y)$ for each detector element in detector 140. In certain embodiments, the range $V(x,y)$ for each $(x,y)$ is between $-1$ and $+1$, wherein $+1$ represents the ideal correlation of one hundred (100%). To maximize $V(x,y)$, the following difference surface, Difference $(x,y)$, is defined in Equation (2).

$$\text{Difference}(x,y)=1-V(x,y) \quad (2)$$

Difference$(x,y)$ is calculated by subtracting the matched filter correlation $V(x,y)$ from unity. In certain embodiments, Difference$(x,y)$ is evaluated (a) point-to-point. In certain embodiments, Difference$(x,y)$ is evaluated as an arithmetic mean. In certain embodiments, Difference$(x,y)$ is evaluated as a geometric mean. In certain embodiments, Difference$(x,y)$ is evaluated as a root-mean-square. In certain embodiments, Difference$(x,y)$ ranges between 0 and +2, wherein the ideal difference for each value of (x,y) is 0, meaning for a value of 0 that there is no difference between the projected orientation image and the reference orientation image at that point (x,y).

In certain embodiments, Difference(x,y) is evaluated point-by-point. In other embodiments, Applicants have found it advantageous to quantify surface Difference(x,y) in terms of a single number, i.e. a correlation factor. In certain embodiments, the pre-sale correlation factor of step 350 comprises a MAX_Difference which is equal to the maximum value of Difference(x,y). In other embodiments, the pre-sale correlation factor of step 350 comprises an AM_Difference comprising the arithmetic mean of the values of Difference(x,y). In still other embodiments, the pre-sale correlation factor of step 350 comprises a GM_Difference comprising the geometric mean of the values of Difference(x,y). In yet other embodiments, the pre-sale correlation factor of step 350 comprises an RMS_Difference comprising the root-mean-square of the values of Difference(x,y).

In step 360 Applicants' method determines if actual overlap of step 350 is greater than or equal to the threshold overlap of step 320. In certain embodiments, in step 360 Applicants' method determines if the pre-sale correlation factor of step 350 is greater than or equal to the threshold manufacturer correlation factor of step 320. In certain embodiments, Applicants' method in step 360 compares a MAX_DIFFERENCE of step 350 with a threshold MAX_DIFFERENCE of step 320. In these embodiments, if the actual MAX_DIFFERENCE of step 350 is less than the threshold MAX_DIFFERENCE of step 320, then Applicants' method determines in step 360 that the pre-sale correlation factor of step 350 is greater than or equal to the threshold manufacturer correlation factor of step 320. In certain embodiments, step 360 is performed by a processor, such as processor 764 (FIG. 7), disposed within a storage controller, such as and without limitation storage controller 760 (FIG. 7).

If Applicants' method determines in step 360 that the pre-sale correlation factor of step 350 is not greater than or equal to the threshold manufacturer correlation factor of step 320, then the method transitions from step 360 to step 370 wherein the manufacturer does not offer the holographic data storage medium for sale. Alternatively, if Applicants' method determines in step 360 that the pre-sale correlation factor of step 350 is greater than or equal to the threshold manufacturer correlation factor of step 320, then the method transitions from step 360 to step 380 wherein the manufacturer offers the holographic data storage medium for sale.

Figure 4:
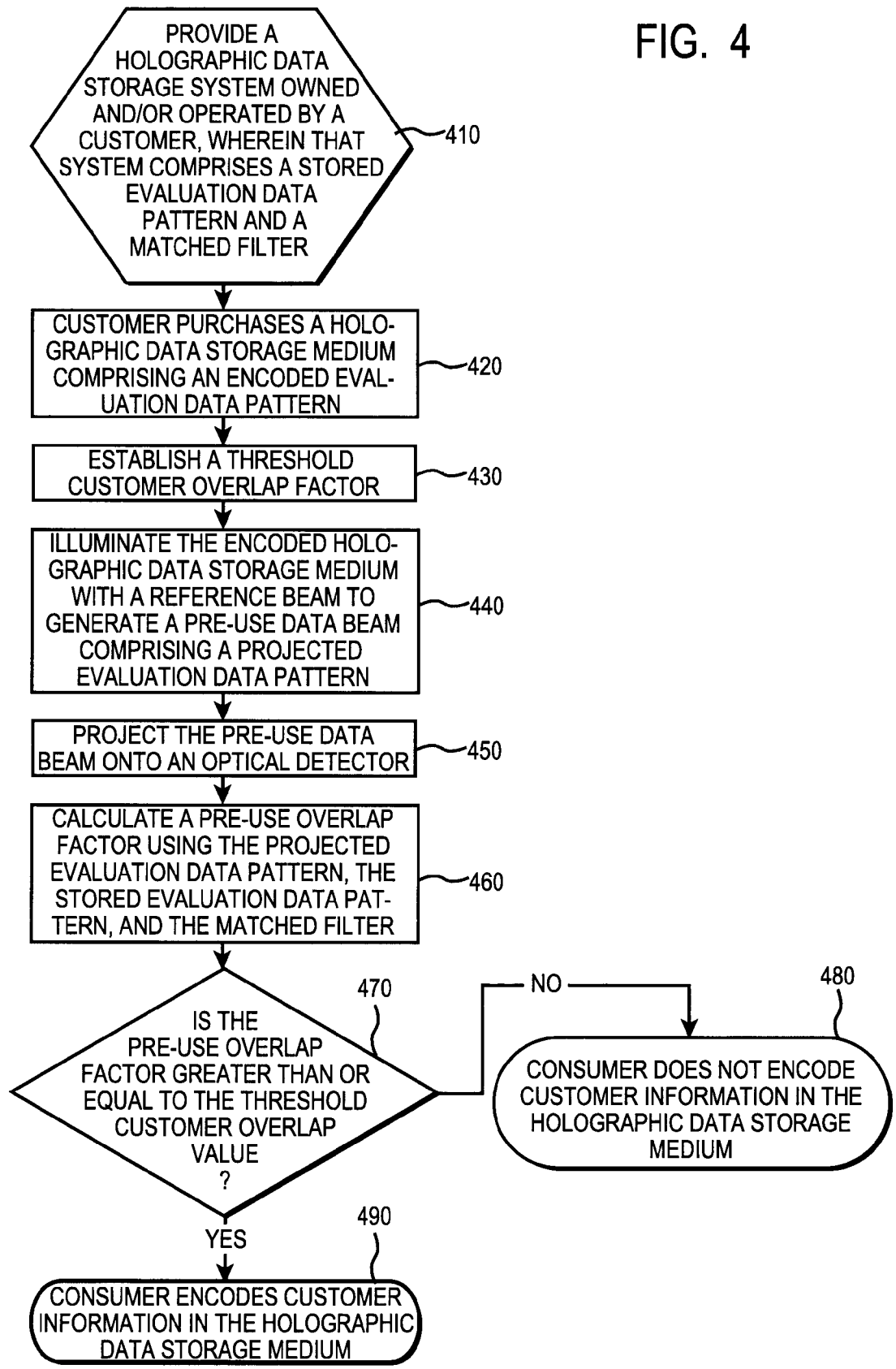
FIG. 4 is a flow chart summarizing a second embodiment of Applicants' method.

Applicants' invention comprises a method to evaluate a holographic data storage medium, whereby the method provides a quality control/quality assurance procedure used by customer after purchasing a holographic data storage medium but prior to encoding customer information in that holographic data storage medium. Referring now to FIG. 4, in step 410 Applicants' method provides a holographic data storage system, such as for example Applicants' holographic data storage system 100 (FIGS. 1A, 1B) or 200 (FIGS. 2A, 2B), and a holographic data storage medium encoded with an evaluation data pattern, such as for example evaluation data pattern 782 (FIG. 7). In certain embodiments, the holographic data storage system is interconnected with a storage controller, such as for example and without limitation storage controller 760 (FIG. 7).

In step 420, a customer purchases a holographic data storage medium, such as for example holographic data storage medium 195 (FIGS. 1A, 1B) or 295 (FIGS. 1B, 2B), comprising an encoded evaluation data pattern, such as for example evaluation data pattern 782 (FIG. 7, 8). In certain embodiments, the encoded evaluation data pattern is integrally formed in the data storage medium 195 (FIGS. 1A, 1B) or 295 (FIGS. 2A, 2B) at the time of manufacture. In other embodiments, the evaluation data pattern is encoded in the holographic data storage medium using a precision holographic data recording apparatus, as shown for example in FIGS. 1A and/or 2A, operated by the manufacturer of the holographic data storage medium.

In step 430, Applicants' method establishes a threshold customer overlap factor comprising the minimum required percentage overlap between a projected evaluation data pattern and a stored evaluation data pattern as seen through a matched filter. In certain embodiments, in step 430 Applicants' method establishes a threshold customer correlation factor. In certain embodiments, the threshold customer correlation factor of step 430 is written to memory 763 (FIG. 7) as threshold customer correlation factor 788 (FIG. 7).

In step 440, Applicants' method illuminates the holographic data storage medium comprising an encoded evaluation data pattern with a reference beam, such as reference beam 190 (FIGS. 1A and 1B) or reflected reference beam 290 (FIGS. 2A and 2B), to generate a pre-use data beam, such as data beam 185 (FIG. 1B) or 285 (FIG. 2B), wherein that pre-use data beam comprises a projected evaluation data pattern, such as projected evaluation data pattern 135 (FIG. 1B) or 235 (FIG. 2B). In step 450, Applicants' method projects the pre-use data beam of step 440 onto the optical detector of step 410, such as optical detector 140 (FIGS. 1A, 1B, 2A, 2B).

In step 460, Applicants' method determines an actual overlap between the projected evaluation data pattern and the stored evaluation pattern as seen through the matched filter. In certain embodiments, in step 460, Applicants' method calculates a pre-use correlation factor using the evaluation data pattern projected onto the optical detector in step 440, a stored evaluation data pattern, such as stored evaluation data pattern 782 (FIG. 7), and a matched filter, such as for example Applicants' matched filter 784 (FIG. 7).

Referring again to FIG. 8, image 800 comprises an evaluation data pattern 782 (FIG. 7) as seen through Applicants' matched filter 784 (FIG. 7), wherein the X' axis of image is 800 parallel to the X axis of optical detector 140 (FIGS. 1A, 1B, 2A, 2B), and wherein the Y' axis of image 800 is parallel to the Y axis of optical detector 140, and wherein the Z' axis of image 800 is parallel to the Z axis of optical detector 140. In certain embodiments, step 750 is performed by a processor, such as processor 764 (FIG. 7), disposed within a storage controller, such as and without limitation storage controller 760 (FIG. 7).

In certain embodiments, in step 460 Applicants' method utilizes Equations (1) and (2) as described hereinabove wherein a Difference(x,y) is calculated by subtracting the matched filter correlation V(x,y) from unity. In certain embodiments, Difference(x,y) is evaluated (a) point-to-point. In certain embodiments, Difference(x,y) is evaluated as an arithmetic mean. In certain embodiments, Difference(x,y) is evaluated as a geometric mean. In certain embodiments, Difference(x,y) is evaluated as a root-mean-square. In certain embodiments, Difference(x,y) ranges between 0 and +2, wherein the ideal difference for each value of (x,y) is 0, meaning for a value of 0 that there is no difference between the projected orientation image and the reference orientation image at that point (x,y).

In certain embodiments, Difference(x,y) is evaluated point-by-point. In other embodiments, Applicants have found it advantageous to quantify surface Difference(x,y) in terms of a single number, i.e. a correlation factor. In certain embodiments, the pre-use correlation factor of step 460 comprises a MAX_Difference which is equal to the maximum value of Difference(x,y). In other embodiments, the pre-use correlation factor of step 460 comprises an AM_Difference comprising the arithmetic mean of the values of Difference(x,y). In still other embodiments, the pre-use correlation factor of step 460 comprises a GM_Difference comprising the geometric mean of the values of Difference(x,y). In yet other embodiments, the pre-use correlation factor of step 460 comprises an RMS_Difference comprising the root-mean-square of the values of Difference(x,y).

In step 470 Applicants' method determines if actual overlap of step 460 is greater than or equal to the threshold overlap of step 430. In certain embodiments, Applicants' method determines in step 470 if the pre-use correlation factor of step 460 is greater than or equal to the threshold manufacturer correlation factor of step 430. In certain embodiments, Applicants' method in step 470 compares a calculated MAX_DIFFERENCE of step 460 with a threshold MAX_DIFFERENCE of step 430. In these embodiments, if the actual MAX_DIFFERENCE of step 460 is less than the threshold MAX_DIFFERENCE of step 430, then Applicants' method determines in step 470 that the pre-use correlation factor of step 460 is greater than or equal to the threshold manufacturer correlation factor of step 430. In certain embodiments, step 470 is performed by a processor, such as processor 764 (FIG. 7), disposed within a storage controller, such as and without limitation storage controller 760 (FIG. 7).

If Applicants' method determines in step 470 that the pre-use correlation factor of step 460 is not greater than or equal to the threshold manufacturer correlation factor of step 430, then the method transitions from step 470 to step 480 wherein the customer does not encode customer information in the holographic data storage medium of step 420. Alternatively, if Applicants' method determines in step 470 that the pre-sale correlation factor of step 460 is greater than or equal to the threshold manufacturer correlation factor of step 430, then the method transitions from step 470 to step 490 wherein the customer encodes customer information in the holographic data storage medium of step 420.

Figure 5:
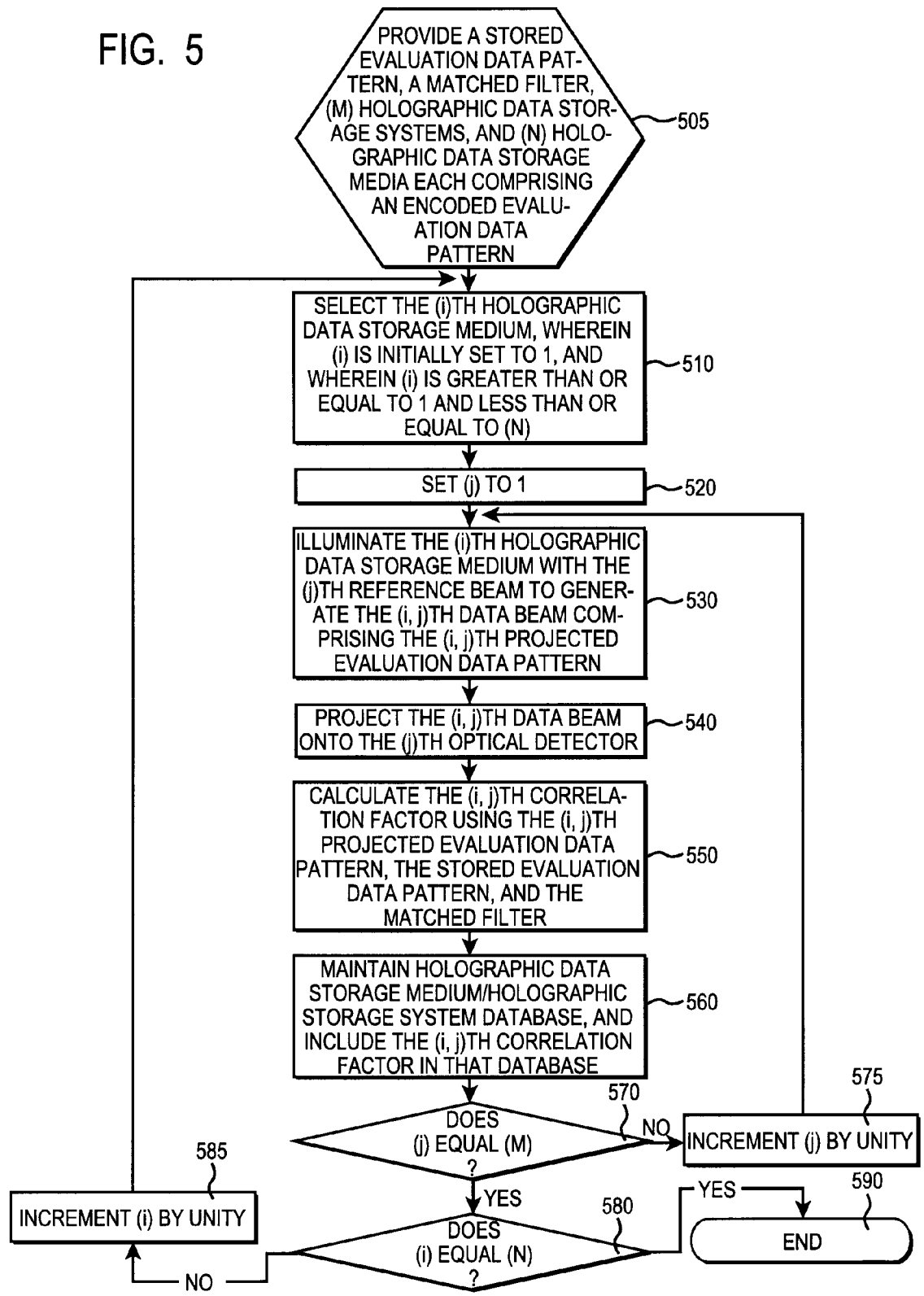
FIG. 5 is a flow chart summarizing a third embodiment of Applicants' method.

Applicants' invention comprises a method to determine for each of a plurality of holographic data storage media which of two or more holographic data storage systems to utilize when storing information within that holographic data storage medium. Referring now to FIG. 5, in step 505 Applicants' method provides a stored evaluation data pattern, such as evaluation data pattern 782 (FIGS. 7, 8), a matched filter, such as matched filter 784 (FIG. 7), (N) holographic data storage medium, wherein each of those media comprise an encoded evaluation data pattern, and (M) holographic data storage systems, such as for example and without limitation one or more holographic data storage systems 100 (FIGS. 1A, 1B) and/or one or more holographic data storage systems 200 (FIGS. 2A, 2B) In certain embodiments, one or more of those (M) holographic data storage systems are interconnected with a storage controller, such as for example and without limitation storage controller 760 (FIG. 7).

In certain embodiments, the encoded evaluation data pattern is integrally formed in the data storage medium, such as holographic data storage medium 195 (FIGS. 1A, 1B) and 295 (FIG. 2A, 2B), at the time of manufacture. In other embodiments, the evaluation data pattern is encoded in the holographic data storage medium using a precision holographic data recording apparatus operated by the manufacturer of the holographic data storage medium.

In step 510, Applicants' method selects the (i)th holographic data storage medium, wherein (i) is initially set to 1, and wherein (i) is greater than or equal to 1 and less than or equal to (N). In step 520, Applicants' method sets (j) to 1.

In step 530, Applicants' method, utilizing the (j)th holographic data storage system, illuminates the (i)th holographic data storage medium with a reference beam, such as reference beam 190 (FIGS. 1A, 1B) or reflected reference beam 290 (FIGS. 2A, 2B), to generate an (i,j)th data beam, such as data beam 185 (FIG. 1B) or data beam 285 (FIG. 2B), wherein that (i,j)th data beam comprises a projected evaluation data pattern, such as projected evaluation data pattern 135 (FIG. 1B) or 235 (FIG. 2B).

In step 540, Applicants' method projects the (i,j)th data beam of step 530 onto an optical detector, such as optical detector 140 (FIGS. 1A, 1B, 2A, 2B). In step 550, Applicants' method calculates an (i,j)th correlation factor using the evaluation data pattern projected onto the optical detector in step 530, a stored evaluation data pattern, such as stored evaluation data pattern 782 (FIG. 7), and a matched filter, such as for example Applicants' matched filter 784 (FIG. 7). In certain embodiments, step 550 is performed by a processor, such as processor 764 (FIG. 7), disposed within a storage controller, such as and without limitation storage controller 760 (FIG. 7).

Referring now to FIG. 8, image 800 comprises a evaluation data pattern 782 (FIG. 7) as seen through Applicants' matched filter 784 (FIG. 7), wherein the X' axis of image is 800 parallel to the X axis of optical detector 140 (FIGS. 1A, 1B, 2A, 2B), and wherein the Y' axis of image 800 is parallel to the Y axis of optical detector 140, and wherein the Z' axis of image 800 is parallel to the Z axis of optical detector 140.

In certain embodiments, in step 550 Applicants' method utilizes Equations (1) and (2) as described hereinabove wherein a Difference(x,y) is calculated by subtracting the matched filter correlation V(x,y) from unity. In certain embodiments, Difference(x,y) is evaluated (a) point-to-point. In certain embodiments, Difference(x,y) is evaluated as an arithmetic mean. In certain embodiments, Difference(x,y) is evaluated as a geometric mean. In certain embodiments, Difference(x,y) is evaluated as a root-mean-square. In certain embodiments, Difference(x,y) ranges between 0 and +2, wherein the ideal difference for each value of (x,y) is 0, meaning for a value of 0 that there is no difference between the projected orientation image and the reference orientation image at that point (x,y).

In certain embodiments, Difference(x,y) is evaluated point-by-point. In other embodiments, Applicants have found it advantageous to quantify surface Difference(x,y) in terms of a single number, i.e. a correlation factor. In certain embodiments, the (i,j)th correlation factor of step 550 comprises a MAX_Difference which is equal to the maximum value of Difference(x,y). In other embodiments, the (i,j)th correlation factor of step 550 comprises an AM_Difference comprising the arithmetic mean of the values of Difference(x,y). In still other embodiments, the (i,j)th correlation factor of step 550 comprises a GM_Difference comprising the geometric mean of the values of Difference(x,y). In yet other embodiments, the (i,j)th correlation factor of step 550 comprises an RMS_Difference comprising the root-mean-square of the values of Difference(x,y).

In step 560, Applicants' method maintains a database comprising, for each value of (i) and for each value of (j), the (i,j)th correlation factor calculated in step 550. In certain embodiments, step 560 is performed by a processor, such as processor 764 (FIG. 7), disposed within a storage controller, such as and without limitation storage controller 760 (FIG. 7).

In step 570, Applicants' method determines if the (i)th holographic data storage medium has been evaluated using each of the (M) holographic data storage systems, i.e. if (j)

equals (M). In certain embodiments, step 570 is performed by a processor, such as processor 764 (FIG. 7), disposed within a storage controller, such as and without limitation storage controller 760 (FIG. 7).

If Applicants' method determines in step 570 that (j) does not equal (M), then the method transitions from step 570 to step 575 wherein the method increments (j) by unity. In certain embodiments, step 575 is performed by a processor, such as processor 764 (FIG. 7), disposed within a storage controller, such as and without limitation storage controller 760 (FIG. 7). Applicants' method transitions from step 575 to step 530 and continues as described herein.

If Applicants' method determines in step 570 that (j) does equal (M), then the method transitions from step 570 to step 580 wherein the method determines if each of the (N) holographic data storage media have been evaluated, i.e. if (i) equals (N).

If Applicants' method determines in step 580 that (i) does not equal (N), then the method transitions from step 580 to step 585 wherein the method increments (i) by unity. In certain embodiments, step 585 is performed by a processor, such as processor 764 (FIG. 7), disposed within a storage controller, such as and without limitation storage controller 760 (FIG. 7). Applicants' method transitions from step 585 to step 510 and continues as described herein. If Applicants' method determines in step 580 that (i) does equal (N), then the method transitions from step 580 to step 590 and ends.

The following example is presented to further illustrate to persons skilled in the art how to make and use the invention. This example is not intended as a limitation, however, upon the scope of the invention, which is defined by the claims set forth below.

Example I

Referring to FIG. 9, database 900 shows the calculated correlation factors, each presented as a MAX_DIFFERENCE as defined hereinabove, for each of 5 holographic data storage media evaluated using 5 holographic data storage systems. Database 900 shows, inter alia, that the smallest MAX_DIFFERENCE using holographic data storage medium 0 was calculated using holographic data storage system 1. More specifically, correlation factor 910, the (0,1)th correlation factor of zero, where (0,1) denotes medium-0 in system-1, comprises the smallest MAX_DIFFERENCE observed when decoding the evaluation data pattern encoded in holographic data storage medium 0. This being the case, the reconstructed data beam comprising the decoded evaluation data pattern using system 1 had the closest match with the stored evaluation data pattern. Therefore, holographic data storage system 1 should be used when reading information encoded in holographic data storage medium 0.

Correlation factor 920, the (1,4)th correlation factor, where medium-1 is in subsystem-4, comprises the smallest MAX_DIFFERENCE calculated when decoding the evaluation data pattern encoded in holographic data storage medium 1. Therefore, holographic data storage system 4 should be used when reading information encoded in holographic data storage medium 1.

Correlation factor 930, the (2,1)th correlation factor, where medium-2 is in system-1, comprises the smallest MAX_DIFFERENCE calculated when decoding the evaluation data pattern encoded in holographic data storage medium 2. Therefore, holographic data storage system 1 should be used when reading information encoded in holographic data storage medium 2.

Correlation factor 940, the (3,3)th correlation factor, where medium-3 is in system-3, comprises the smallest MAX_DIFFERENCE calculated when decoding the evaluation data pattern encoded in holographic data storage medium 3. Therefore, holographic data storage system 3 should be used when reading information encoded in holographic data storage medium 3.

Correlation factor 950, the (4,2)th correlation factor, where medium-4 is in system-2, comprises the smallest MAX_DIFFERENCE calculated when decoding the evaluation data pattern encoded in holographic data storage medium 4. Therefore, holographic data storage system 2 should be used when reading information encoded in holographic data storage medium 4.

Applicants' invention comprises a method to periodically evaluate the viability of a holographic data storage medium comprising an encoded evaluation data pattern and further comprising encoded information. Referring now to FIG. 6A, in step 610 Applicants' method provides a holographic data storage medium comprising an encoded evaluation data pattern and encoded information, and a holographic data storage system comprising a stored evaluation data pattern and a matched filter.

In step 615, Applicants' method establishes a threshold overlap comprising the minimum required percentage overlap between a projected evaluation data pattern and a stored evaluation data pattern as seen through a matched filter. In certain embodiments, step 615 comprises establishing a viability threshold correlation factor. In certain embodiments, the viability threshold correlation factor of step 615 is written to memory 763 (FIG. 7) as viability threshold correlation factor 786 (FIG. 7).

In step 620, Applicants' method established an evaluation time interval. In certain embodiments, the evaluation time interval of step 620 is set by the owner and/or operator of the holographic data storage system. In certain embodiments, the evaluation time interval of step 620 is set by the owner and/or operator of the information encoded in the holographic data storage medium.

In step 625, Applicants' method sets (k) equal to 0. In step 630, Applicants' method at time T(k) begins the (k)th evaluation time interval.

In step 635, at time T(k) Applicants' method illuminates the holographic data storage medium comprising encoded evaluation data pattern with a reference beam, such as reference beam 190 (FIGS. 1A, 1B) or reflected reference beam 290 (FIGS. 2A, 2B), to generate a T(k)th data beam, such as data beam 185 (FIG. 1B) or 285 (FIG. 2B), wherein that T(k)th data beam comprises a projected T(k)th evaluation data pattern, such as projected evaluation data pattern 135 (FIG. 1B) or 235 (FIG. 2B). In step 640, Applicants' method projects the T(k)th data beam of step 635 onto an optical detector, such as optical detector 140 (FIGS. 1A, 1B, 2A, 2B).

In step 645, Applicants' method determines the overlap between the projected evaluation data pattern and the stored evaluation pattern as seen through the matched filter. In certain embodiments, step 645 comprises calculating a T(k)th correlation factor using the evaluation data pattern projected onto the optical detector in step 640, a stored evaluation data pattern, such as stored evaluation data pattern 782 (FIG. 7), and a matched filter, such as for example Applicants' matched filter 784 (FIG. 7).

Referring again to FIG. 8, image 800 comprises a evaluation data pattern 782 (FIG. 7) as seen through Applicants' matched filter 784 (FIG. 7), wherein the X' axis of image is 800 parallel to the X axis of optical detector 140 (FIGS. 1A, 1B, 2A, 2B), and wherein the Y' axis of image 800 is parallel to the Y axis of optical detector 140, and wherein the Z' axis of image 800 is parallel to the Z axis of optical detector 140. In certain embodiments, step 645 is performed by a processor, such as processor 764 (FIG. 7), disposed within a storage controller, such as and without limitation storage controller 760 (FIG. 7).

In certain embodiments, in step 645 Applicants' method utilizes Equations (1) and (2) as described hereinabove wherein a Difference(x,y) is calculated by subtracting the matched filter correlation V(x,y) from unity. In certain embodiments, Difference(x,y) is evaluated (a) point-to-point. In certain embodiments, Difference(x,y) is evaluated as an arithmetic mean. In certain embodiments, Difference(x,y) is evaluated as a geometric mean. In certain embodiments, Difference(x,y) is evaluated as a root-mean-square. In certain embodiments, Difference(x,y) ranges between 0 and +2, wherein the ideal difference for each value of (x,y) is 0, meaning for a value of 0 that there is no difference between the projected orientation image and the reference orientation image at that point (x,y).

In certain embodiments, Difference(x,y) is evaluated point-by-point. In other embodiments, Applicants have found it advantageous to quantify surface Difference(x,y) in terms of a single number, i.e. a correlation factor. In certain embodiments, the T(k)th correlation factor of step 645 comprises a MAX_Difference which is equal to the maximum value of Difference(x,y). In other embodiments, the T(k)th correlation factor of step 645 comprises an AM_Difference comprising the arithmetic mean of the values of Difference(x,y). In still other embodiments, the T(k)th correlation factor of step 645 comprises a GM_Difference comprising the geometric mean of the values of Difference(x,y). In yet other embodiments, the T(k)th correlation factor of step 645 comprises an RMS_Difference comprising the root-mean-square of the values of Difference(x,y).

In certain embodiments wherein Applicants' method in step 645 calculates an actual MAX_DIFFERENCE correlation factor, wherein a 100% overlap between the projected evaluation data pattern and the stored evaluation data pattern as seen through the matched filter gives an actual MAX_DIFFERENCE value of 0.

Figure 6B:
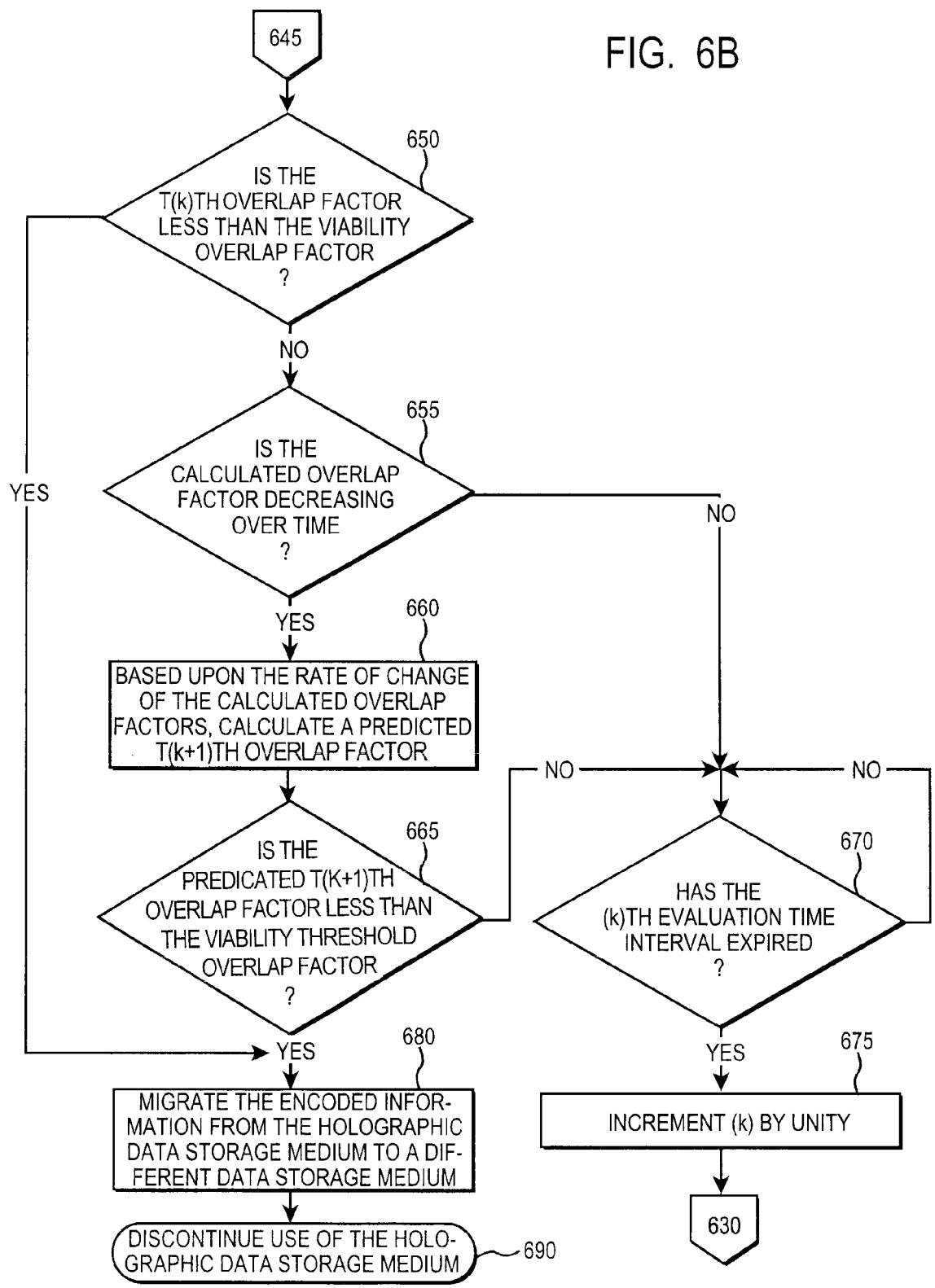
FIG. 6B is a flow chart summarizing additional steps in the method of FIG. 6A.

Referring now to FIG. 6B, in step 650 Applicants' method determines if the T(k)th overlap of step 645 is greater than or equal to the threshold overlap of step 615. In certain embodiments, step 650 is performed by a processor, such as processor 764 (FIG. 7), disposed within a storage controller, such as and without limitation storage controller 760 (FIG. 7).

In certain embodiments, Applicants' method in step 650 compares the (k)th MAX_DIFFERENCE of step 645 with a threshold MAX_DIFFERENCE of step 615. In these embodiments, if the (k)th MAX_DIFFERENCE of step 645 is less than the threshold MAX_DIFFERENCE of step 615, then Applicants' method determines that the actual overlap of step 645 is greater than the threshold overlap of step 615.

If Applicants' method determines in step 650 that the T(k)th overlap of step 645 is not greater than or equal to the viability threshold overlap of step 615, then the method transitions from step 650 to step 680 wherein the method migrates the information encoded in the holographic data storage medium to a replacement data storage medium. In certain embodiments, step 680 is performed by a processor, such as processor 764 (FIG. 7), disposed within a storage controller, such as and without limitation storage controller 760 (FIG. 7). Applicants' method transitions from step 680 to step 690 wherein the method discontinues use of the holographic data storage medium.

In certain embodiments, in step 680 Applicants' method decodes the information encoded in the holographic data storage medium of step 610 by sequentially illuminating that holographic data storage medium one page of information at a time, projecting, one page at a time, a data beam comprising an image of that page onto an optical detector, such as optical detector 140, digitizing the information comprising that image, and storing that digitized information in a data cache, such as data cache 766 (FIG. 7) and/or data cache 767 (FIG. 7).

Step 680 further comprises providing a replacement data storage medium, which may or may not comprise a holographic data storage medium. In certain embodiments, the digitized information is subsequently copied from the one or more data caches to a replacement holographic data storage medium. In certain embodiments, the digitized information is subsequently copied from the one or more data caches to a magnetic data storage medium, such as for example one or more magnetic disks, one or more magnetic tapes, and the like. In certain embodiments, the digitized information is subsequently copied from the one or more data caches to one or more optical storage media, such as for example one or more CDs, one or more DVDs, and the like. In certain embodiments, the digitized information is subsequently copied from the one or more data caches to one or more electronic storage media, such as for example one or more PROMs, EPROMs, EEPROMs, Flash PROMs, COMPACTFLASH, SMARTMEDIA, and the like. (COMPACTFLASH is a registered trademark of Sandisk Corporation; and SMARTMEDIA is a registered trademark of Toshiba Corporation).

Alternatively, if Applicants' method determines in step 650 that the T(k)th overlap factor of step 645 is greater than or equal to the viability threshold correlation factor of step 615, then the method transitions from step 650 to step 655 wherein the method determines if the actual overlap factor is decreasing over time. In certain embodiments, step 655 is performed by a processor, such as processor 764 (FIG. 7), disposed within a storage controller, such as and without limitation storage controller 760 (FIG. 7).

In certain embodiments, Applicants' method in step 655 determines if the actual MAX_DIFFERENCE values calculated in step 645 at various evaluation time intervals are increasing over time.

If Applicants' method determines in step 655 that the actual overlap factor is not decreasing over time, then the method transitions from step 655 to step 670 wherein the method determines if the (k)th evaluation time interval has expired. In certain embodiments, step 670 is performed by a processor, such as processor 764 (FIG. 7), disposed within a storage controller, such as and without limitation storage controller 760 (FIG. 7). If Applicants' method determines in step 670 that the (k)th evaluation time interval has not expired, the method pauses until that (k)th evaluation time interval has expired.

If Applicants' method determines in step 670 that the (k)th evaluation time interval has expired, then the method transitions from step 670 to step 675 wherein the method increments (k) by unity. In certain embodiments, step 675 is performed by a processor, such as processor 764 (FIG. 7), disposed within a storage controller, such as and without limitation storage controller 760 (FIG. 7). Applicants' method transitions from step 675 to step 630 and proceeds as described herein.

Alternatively, if Applicants' method determines in step 655 that the actual overlap factor is decreasing with time, then the method transitions from step 655 to step 660 wherein the method calculates a predicted (k+1)th overlap factor. In certain embodiments, step 660 is performed by a processor, such as processor 764 (FIG. 7), disposed within a storage controller, such as and without limitation storage controller 760 (FIG. 7).

In step 665, Applicants' method determines if the predicted (k+1)th overlap factor of step 660 is smaller than the viability threshold overlap factor of step 615. In certain embodiments, in step 665 Applicants' method determines if the predicted (k+1) MAX_DIFFERENCE is less than the threshold MAX_DIFFERENCE value of step 615.

If Applicants' method determines in step 665 that the predicted (k+1)th overlap factor is smaller than the threshold viability overlap factor, then the method transitions from step 665 to step 680 and continues as described herein. Alternatively, if Applicants' method determines in step 665 that the predicted (k+1)th overlap factor is not smaller than the threshold viability overlap factor, then the method transitions from step 665 to step 670 and proceeds as described herein.

The following examples are presented to further illustrate to persons skilled in the art how to make and use the invention. These examples are not intended as limitations, however, upon the scope of the invention, which is defined by the claims set forth below.

Example II

Referring to FIG. 10A, graph 1000 shows actual overlap factors 1010, 1020, and 1030, calculated at times T(k−2), T(k−1), and T(k), respectively. In step 655, Applicants' method determines curve 1040 which shows the change in the actual overlap factor with respect to time, such as V(x,y), eqn.(1). In the illustrated embodiment of FIG. 10A, curve 1040 comprises a first order regression analysis using datapoints 1010, 1020, and 1030. In other embodiments, and depending on the number of actual datapoints available, Applicants' method utilizes an n(th) order regression analysis in step 655, wherein (n) is greater than or equal to 1 and less than or equal to about 6, to include parabolic, cubic, etc. effects. Curve 1040 is used to predict the (k+1)th overlap 1050.

In the illustrated embodiment of FIG. 10A, predicted (k+1)th overlap factor 1050 is greater than the threshold overlap factor 1060. Therefore using the illustrated embodiment of FIG. 10A, Applicants' method would determine in step 665 that the predicted (k+1)th overlap factor is greater than the threshold overlap factor.

Example III

Figure 10B:
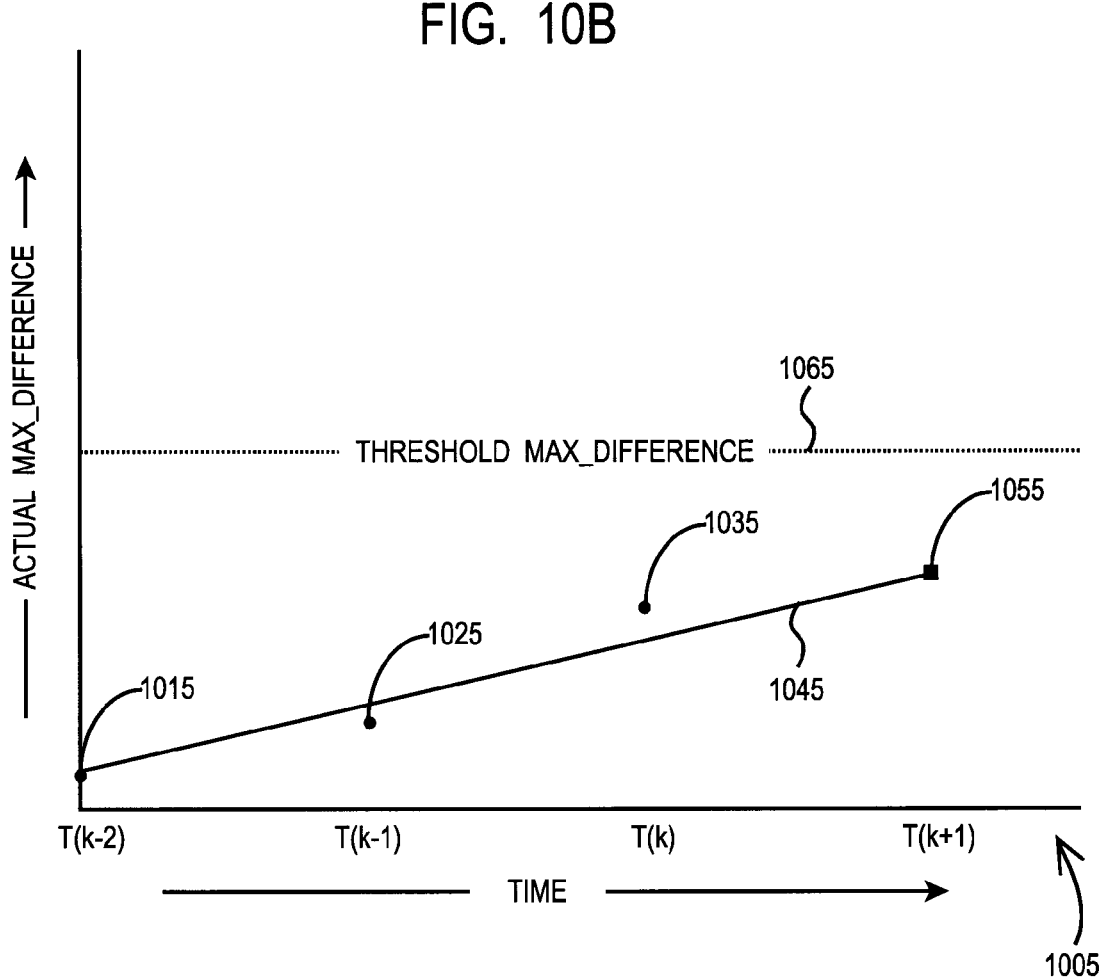
FIG. 10B is a graph showing three calculated overlap values and a predicted fourth overlap value, where each of those overlap values comprises a MAX_DIFFERENCE value.

Referring now to FIG. 10B, graph 1005 shows actual MAX_DIFFERENCE values 1015, 1025, and 1035, calculated at times T(k−2), T(k−1), and T(k), respectively. In certain embodiments in step 660, Applicants' method determines curve 1045 which shows the change in the Difference (x,y) eqn.(2). Specific values of D(x,y) may be expressed as actual MAX_DIFFERENCE, AM_DIFFERENCE, GM_DIFFERENCE, or RMS_DIFFERENCE values with respect to time. In the illustrated embodiment of FIG. 10B, curve 1045 comprises a first order regression analysis using datapoints 1015, 1025, and 1035. In other embodiments, and depending on the number of actual datapoints available, Applicants' method utilizes an n(th) order regression analysis in step 660, wherein (n) is greater than or equal to 1 and less than or equal to about 6, to include parabolic, cubic, etc. effects. Curve 1045 is used to predict the (k+1)th MAX_DIFFERENCE 1055, or alternately (k+1)th AM_DIFFERENCE, GM_DIFFERENCE, or RMS_DIFFERENCE.

In the illustrated embodiment of FIG. 10B, predicted (k+1)th MAX_DIFFERENCE value 1055 is less than the threshold MAX_DIFFERENCE value 1065. Therefore using the illustrated embodiment of FIG. 10B, Applicants' method would determine in step 665 that the predicted (k+1)th MAX_DIFFERENCE value is greater than the threshold MAX_DIFFERENCE value, and therefore the predicted overlap factor is greater than the threshold overlap factor.

In certain embodiments, individual steps recited in FIGS. 3, 4, 5, 6A, and/or 6B, may be combined, eliminated, or reordered.

In certain embodiments, Applicants' invention includes instructions, such as instructions 789 (FIG. 7) residing memory 763 (FIG. 7), where those instructions are executed by a processor, such as 764 (FIG. 7), to perform one or more of steps 330, 340, 350, and/or 360 recited in FIG. 3. In certain embodiments, Applicants' invention includes instructions, such as instructions 789 (FIG. 7) residing memory 763 (FIG. 7), where those instructions are executed by a processor, such as 764 (FIG. 7), to perform one or more of steps 440, 450, 460, and/or 470 recited in FIG. 4. In certain embodiments, Applicants' invention includes instructions, such as instructions 789 (FIG. 7) residing memory 763 (FIG. 7), where those instructions are executed by a processor, such as 764 (FIG. 7), to perform one or more of steps 510, 520, 530, 540, 550, and/or 560 recited in FIG. 5. In certain embodiments, Applicants' invention includes instructions, such as instructions 789 (FIG. 7) residing memory 763 (FIG. 7), where those instructions are executed by a processor, such as 764 (FIG. 7), to perform one or more of steps 625, 630, 635, 640, 645, 650, 655, 660, 665, 670, 675, and/or 680, recited in FIGS. 6A and 6B.

In other embodiments, Applicants' invention includes instructions residing in any other computer program product, where those instructions are executed by a computer external to, or internal to, system 100, to perform one or more of steps 330, 340, 350, and/or 360 recited in FIG. 3, and/or one or more of steps 440, 450, 460, and/or 470 recited in FIG. 4, and/or one or more of steps 510, 520, 530, 540, 550, and/or 560 recited in FIG. 5, and/or one or more of steps 625, 630, 635, 640, 645, 650, 655, 660, 665, 670, 675, and/or 680, recited in FIGS. 6A and 6B. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, COMPACTFLASH, SMARTMEDIA, and the like. (COMPACTFLASH is a registered trademark of Sandisk Corporation; and SMARTMEDIA is a registered trademark of Toshiba Corporation).

Either AM_DIFFERENCE, GM_DIFFERENCE, or RMS_DIFFERENCE can be substituted for MAX_DIFFERENCE in table 900 of FIG. 9, as well as FIG. 10B.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to evaluate a holographic data storage medium, comprising the steps of:

holographically encoding an evaluation data pattern in said holographic data storage medium by a manufacturer of said holographic data storage medium by interacting a data beam comprising said evaluation data pattern with a reference beam;

supplying a holographic data storage system comprising a stored evaluation data pattern, a matched filter, a light source, and an optical detector;

supplying said holographic data storage medium comprising said encoded evaluation data pattern, wherein said holographic data storage medium has not been sold in commerce;

establishing a threshold manufacturer overlap value;

illuminating said holographic data storage medium with said reference beam emitted by said light source to generate a pre-sale reconstructed data beam comprising a reconstructed evaluation data pattern;

projecting said pre-sale reconstructed data beam onto said optical detector;

calculating a pre-sale overlap value using said reconstructed evaluation data pattern, said stored evaluation data pattern, and said matched filter;

determining if said pre-sale overlap value is greater than or equal to said threshold manufacturer overlap value;

operative if said pre-sale overlap value is greater than or equal to said threshold manufacturer overlap value, offering said holographic data storage medium for sale in commerce;

operative if said pre-sale overlap value is not greater than or equal to said threshold manufacturer overlap value, not offering said holographic data storage medium for sale in commerce.

2. The method of claim 1, wherein said supplying a holographic data storage system further comprises supplying a mirror, said illuminating step further comprising the steps of:
reflecting said reference beam off said mirror;
projecting said reflected reference beam onto said holographic data storage medium.

3. The method of claim 1, wherein said illuminating step does not comprise reflecting said reference beam.

4. A method to evaluate a holographic data storage medium, comprising the steps of:
supplying a holographic data storage system comprising a stored evaluation data pattern, a matched filter, a light source, and an optical detector;

purchasing by a customer said holographic data storage medium comprising an encoded evaluation data pattern, wherein said holographic data storage medium has not been used to encode customer information, wherein said encoded evaluation data pattern was holographically encoded in said holographic data storage medium by a manufacturer of said holographic data storage medium by interacting a data beam comprising said evaluation data pattern with a reference beam;

establishing a threshold customer overlap value;

illuminating said holographic data storage medium with a reference beam emitted by said light source to generate a pre-use reconstructed data beam comprising a reconstructed evaluation data pattern;

projecting said pre-use reconstructed data beam onto said optical detector;

calculating a pre-use overlap value using said reconstructed evaluation data pattern, said stored evaluation data pattern, and said matched filter;

determining if said pre-use overlap value is greater than or equal to said threshold customer overlap value;

operative if said pre-use overlap value is greater than or equal to said threshold customer overlap value, using said holographic data storage medium to encode customer information;

operative if said pre-use overlap value is not greater than or equal to said threshold customer overlap value, not using said holographic data storage medium to encode customer information.

5. The method of claim 4, wherein said supplying a holographic data storage system further comprises supplying a mirror, said illuminating step further comprising the steps of:
reflecting said reference beam off said mirror;
projecting said reflected reference beam onto said holographic data storage medium.

6. The method of claim 4, wherein said illuminating step does not comprise reflecting said reference beam.

7. A method to evaluate a holographic data storage medium, comprising the steps of:
supplying a holographic data storage system comprising a stored evaluation data pattern, a matched filter, a light source, and an optical detector;

providing said holographic data storage medium comprising an encoded evaluation data pattern and encoded information, wherein said encoded evaluation data pattern was holographically encoded in said holographic data storage medium by a manufacturer of said holographic data storage medium;

establishing a threshold viability overlap value;

establishing an evaluation time interval;

at time Tk beginning the kth evaluation interval;

at time Tk illuminating said holographic data storage medium with a reference beam emitted by said light source to generate a Tkth reconstructed data beam comprising a Tkth reconstructed evaluation data pattern;

projecting said Tkth reconstructed data beam onto said optical detector;

calculating a Tkth overlap value using said Tkth reconstructed evaluation data pattern, said stored evaluation data pattern, and said matched filter;

determining if said Tkth overlap value is greater than or equal to said threshold viability overlap value;

operative if said Tkth overlap value is not greater than or equal to said threshold viability overlap value:

providing a replacement data storage medium; and migrating said encoded information to said replacement data storage medium.

8. The method of claim 7, wherein said supplying a holographic data storage system step further comprises supplying a mirror, said wherein said illuminating step further comprising the steps of:
reflecting said reference beam off said mirror;
projecting said reflected reference beam onto said holographic data storage medium.

9. The method of claim 7, wherein said illuminating step does not comprise reflecting said reference beam.

10. The method of claim 7, further comprising the steps of:
operative if said Tkth overlap value is greater than or equal to said threshold viability overlap value:
determining if the Tk−1th overlap value is less than said Tkth overlap value;
operative if the Tk−1th overlap value is not less than said Tkth overlap value:

at the expiration of the kth evaluation time interval, incrementing k by unity and repeating said illuminating step, said projecting step, said calculating step, and optionally said migrating step.

11. The method of claim 10, further comprising the steps of:
- operative if the Tk−1th overlap value is less than said Tkth overlap value:
- calculating a predicted Tk+1th overlap value;
- determining if said predicted Tk+1th overlap value is greater than or equal to said threshold viability overlap value;
- operative if said predicted Tk+1th overlap value is not greater than or equal to said threshold viability overlap value, migrating said encoded information to said replacement data storage medium.

12. The method of claim 11, further comprising the steps of:
- operative if said predicted Tk+1th overlap value is greater than or equal to said threshold viability overlap value, at the expiration of the kth evaluation time interval, incrementing k by unity and repeating said illuminating step, said projecting step, said calculating step, and optionally said migrating step.

13. The method of claim 11, wherein said calculating a predicted Tk+1th overlap value further comprises using a linear regression analysis.

14. The method of claim 11, wherein said calculating a predicted Tk+1th overlap value further comprises using an nth order regression analysis, wherein n is greater than or equal to 2 and less than or equal to about 6.

* * * * *